United States Patent [19]
Itoh et al.

[11] Patent Number: 5,760,384
[45] Date of Patent: Jun. 2, 1998

[54] INFORMATION STORAGE MEDIUM AND METHOD FOR DETECTING FORGERIES

[75] Inventors: Noriyuki Itoh, Sugito-Machi; Masahiko Wakana, Tokyo; Manabu Suzuki, Hasuda; Haruki Ohta, Sugito-Machi, all of Japan

[73] Assignee: Toppan Printing Co., Ltd., Tokyo, Japan

[21] Appl. No.: 582,361

[22] Filed: Jan. 5, 1996

[30] Foreign Application Priority Data

Jan. 20, 1995 [JP] Japan .................................. 7-007678

[51] Int. Cl.⁶ .................................................. G06K 7/10
[52] U.S. Cl. .................... 235/468; 235/491; 235/494; 235/454; 283/72; 283/91; 283/904
[58] Field of Search ................................ 235/468, 487, 235/457, 462, 454, 491, 494; 283/72, 91, 904

[56] References Cited

U.S. PATENT DOCUMENTS

| | | | |
|---|---|---|---|
| 4,359,633 | 11/1982 | Bianco | 235/468 |
| 4,538,059 | 8/1985 | Rudland | 235/468 |
| 4,663,518 | 5/1987 | Borror et al. | 235/468 X |
| 4,853,525 | 8/1989 | Vogt et al. | 235/469 |
| 5,210,411 | 5/1993 | Oshima et al. | 235/468 X |
| 5,525,798 | 6/1996 | Berson et al. | 235/491 X |
| 5,532,104 | 7/1996 | Goto | 235/491 X |

FOREIGN PATENT DOCUMENTS

| | | |
|---|---|---|
| 0 059 318 | 9/1982 | European Pat. Off. |
| 0300729 | 1/1989 | European Pat. Off. |
| 0 459 789 | 12/1991 | European Pat. Off. |
| 0 516 927 | 12/1992 | European Pat. Off. |
| 002682790 | 4/1993 | France |
| 2553811 | 6/1977 | Germany |
| 57-201963 | 12/1982 | Japan |
| 58-45999 | 3/1983 | Japan |
| 1-305484 | 12/1989 | Japan |
| 3-31982 | 2/1991 | Japan |
| 3-48382 | 3/1991 | Japan |
| 3-154187 | 7/1991 | Japan |

*Primary Examiner*—Donald T. Hajec
*Assistant Examiner*—Michael G. Lee
*Attorney, Agent, or Firm*—Burns, Doane, Swecker & Mathis, LLP

[57] ABSTRACT

An information storage medium has a base portion and a code storage portion. The code storage portion is disposed on the base portion and contains an infrared absorber which absorbs substantially only infrared rays within a narrow wavelength band. If a real information storage medium is produced like that, subject mediums are judged real or not by a method includes the steps of emitting rays to the subject medium, receiving rays reflected from the subject medium, detecting a first reflectance at the peak absorption wavelength and a second reflectance at a comparison wavelength near the peak wavelength, and judging if the subject medium is real or not. The rays at the comparison wavelength are not very much absorbed by the absorber.

13 Claims, 5 Drawing Sheets

1

INFORMATION STORAGE MEDIUM AND METHOD FOR DETECTING FORGERIES

BACKGROUND OF THE INVENTION

The present invention relates to an information storage medium including a code storage portion, e.g., a bar code portion. The invention also relates to a method and an apparatus for judging if a subject information storage medium is real or not when the real medium is produced according to the present invention.

In recent years, code storage portions, for example, bar codes, which may be detected by optical readers, have been attached to various goods. Information recorded at such code storage portions may be utilized for merchandise management, e.g., distinction of items in POS (point of sale) system and so on. Usually, a bar code is constituted of black and white bars having different widths which cooperate to represent codes or information. An optical reader emits rays within a specific range of wavelength and receives the rays reflected from the bar code. Then, the reader can detect the widths of the black and white bars since the reflectance from the black bars and the reflectance from the white bars are remarkably different from each other.

However, such bar codes including black or dark bars may make the appearance of the goods cheap, so that it is not suitable to attach the visible bar codes to expensive, sophisticated or aesthetic goods. Therefore, bar codes, which do not absorb visible rays, but absorb infrared so as to be invisible for human beings, have been developed.

JP-A-57-201963 (published in 1982) and JP-A-1-305484 (published in 1989) discloses a bar code which is transparent for visible rays and absorbs infrared rays. However, conventional infrared absorbers absorb a wide range of wavelength. Thus, they are not transparent for visible rays completely in fact.

Accordingly, in order to conceal such bar codes, a cover layer, made of infrared-transparent and invisible materials, was proposed in JP-A-58-45999 (published in 1983).

Besides, JP-A-3-154187 (published in 1991) discloses that a cover layer, made of infrared-transparent and invisible materials made of materials, is mounted on a bar code made of an infrared absorber which absorbs infrared rays within the specific wavelength range between 700 nm and 1500 nm. These known techniques may resolve the above-described problem since the bar codes are difficult to be found by human beings and do not make the appearance of the goods cheap. On the other hand, it is a very important consideration that the code storage portions, e.g., bar codes or the like should be prevented from being forged or counterfeited. The above-described prior art techniques for concealing may be one of the means for protecting against forgers or counterfeiters since the bar codes are invisible. However, if a forger uses infrared scopes, the concealed bar codes can be inspected easily since the conventional infrared absorbers absorb a wide range of wavelength. In addition, since there are many kinds of infrared absorbers, it is not difficult to forge such bar codes using with known infrared absorbers on the basis of the inspection.

SUMMARY OF THE INVENTION

Accordingly, it is an object of the present invention to provide an information storage medium which is extremely difficult to be forged or counterfeited. Another object of the present invention is to provide a method and an apparatus for judging if a subject information storage medium is real or not when the real information storage medium is produced according to the present invention.

In accordance with the present invention, an information storage medium comprises a base portion and a code storage portion. The code storage portion is disposed on the base portion and contains a light absorber. The light absorber absorbs substantially only specific rays within a narrow wavelength band. It is preferable that the light absorber is an infrared absorber which absorbs substantially only infrared within a narrow wavelength band, but absorbs visible rays little.

With such a construction, since the infrared absorber absorbs substantially only infrared within a narrow wavelength band, the code storage portion is extremely difficult to be detected by means of infrared scopes in comparison with the conventional infrared absorbers which absorbs a wide range of wavelength of infrared rays. In addition, such an absorber absorbing substantially only specific rays within the narrow wavelength band is difficult extremely to be produced using with other components, and thus, it is prevented to forge or counterfeit the information storage medium according to the present invention. Besides, since the infrared absorber absorbs visible rays little, the code storage portion can be made invisible, and therefore may not make the appearance of expensive, sophisticated or aesthetic goods cheap.

In another aspect of the present invention, subject information storage mediums are judged real or not by a method in case that the real information storage medium includes a base portion and a code storage portion disposed on the base portion, the code storage portion containing a light absorber, the light absorber being capable of absorbing substantially only specific rays within a narrow wavelength band, the narrow wavelength band including a peak wavelength at which the light absorber absorbs the most. The method comprises the steps of emitting rays to the subject information storage medium, receiving rays reflected from the subject medium, detecting a first reflectance at the peak wavelength and a second reflectance at a comparison wavelength near the peak wavelength, and judging if the subject medium is real or not on the basis of the first reflectance and the second reflectance. The rays at the comparison wavelength are not absorbed by the light absorber very much. That is, the comparison wavelength is near or at the critical point of the narrow wavelength band which the light absorber absorbs.

By the method according to the present invention, since the comparison wavelength is near the peak absorption wavelength and the rays at the comparison wavelength are not absorbed substantially, an accurate detection of a forged medium is ensured. In other words, improved is the accuracy of judgement if an information storage medium is real or not.

Preferably, in the judging step, a difference between the first reflectance and second reflectance is obtained, and the subject medium is judged real if the difference between the first reflectance and the second reflectance is greater than a certain value. But, the subject medium is judged as a forgery if the difference is equal to or less than the certain value.

In this case, if the certain value is variable, it will be determined high for expensive goods which need high reliability. On the other hand, the certain value will be determined low for inexpensive goods which do not need high reliability.

The light absorber is preferably an infrared absorber being capable of absorbing substantially only infrared within a narrow wavelength band, but absorbing visible rays little, so that the code storage portion may be concealed. In this case, the rays used at the emitting step contain at least infrared rays which are absorbed by said light absorber.

It is preferable that the difference between the peak wavelength and the comparison wavelength is prescribed greater than 10 nm and equal to or less than 100 nm.

This means that the narrow wavelength band, which the light absorber absorbs, is very much narrow since the comparison wavelenght is near or at the critical point of the narrow wavelength band as mentioned above. Such a light absorber may be made of only specific components practically, and thus subject information mediums will be judged as a forged one when the components are different from those of the real medium. Accordingly, the accuracy of the judgement is further improved.

In another aspect of the present invention, subject information storage mediums are judged real or not by an apparatus in case that the real information storage medium includes a base portion and a code storage portion disposed on the base portion, the code storage portion containing a light absorber, the light absorber being capable of absorbing substantially only specific rays within a narrow wavelength band, the narrow wavelength band including a peak wavelength at which the light absorber absorbs the most. The apparatus comprises an emitting means, receiving means and a judging means. The emitting means emits rays to the subject information storage medium, the rays containing at least rays of the peak wavelength and rays of a comparison wavelength near the peak wavelength, which are not absorbed by the light absorber very much. The receiving means receives the rays reflected from the subject medium and provides a first output signal in accordance with a first reflectance at the peak wavelength and a second output signal according to a second reflectance at the comparison wavelength. The judging means obtains the difference between the first signal and the second signal, and judges if the subject medium is real or not on the basis of the difference between the first signal and the second signal.

More preferably, the judging means judges the subject medium real if the difference between the first signal and the second signal is greater than a certain value, and judges the subject medium as a forgery if the difference is equal to or less than the certain value.

In a preferable aspect, the emitting means emits at least infrared rays for inspecting the subject medium when the light absorber of the real information storage medium is an infrared absorber, the infrared absorber being capable of absorbing substantially only infrared within a narrow wavelength band, but absorbing visible rays little.

It is also preferable that a difference between the peak wavelength and the comparison wavelength, by which the receiving means provides the first and second output signals, is prescribed greater than 10 nm and equal to or less than 100 nm.

BRIEF DESCRIPTION OF THE DRAWINGS

These and other objects and advantages of the present invention will be appreciated by the description hereinafter with reference to the accompanying drawings, in which.

DETAILED DESCRIPTION OF PREFERRED EMBODIMENTS OF THE INVENTION

Figure 1:
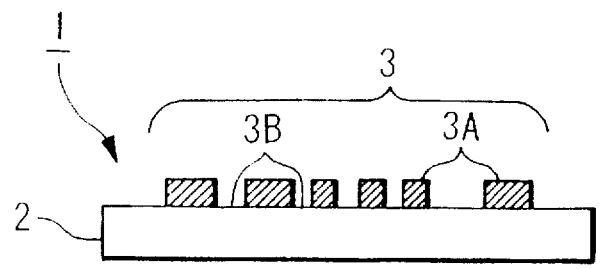
FIG. 1 is an enlarged cross sectional view showing an information storage medium according to an embodiment of the present invention.

FIG. 1 shows an information storage medium 1 according to an embodiment of the present invention. The medium 1 includes a card-like base 2 and a code storage portion (bar code) 3 disposed on the upper surface on the base 2. The code storage portion 3 is constituted of absorber portions 3A and blank portions 3B arranged alternately. The absorber portions 3A are made of an infrared absorber printed on the base 2, and the widths of the absorber portions 3A and the blank portions 3B cooperate to represent codes or information. In FIG. 1, although the thickness of the absorber portions 3A is enlarged very much than the base 2 for easy understanding, the absorber portions 3A is very thin actually.

Figure 2:
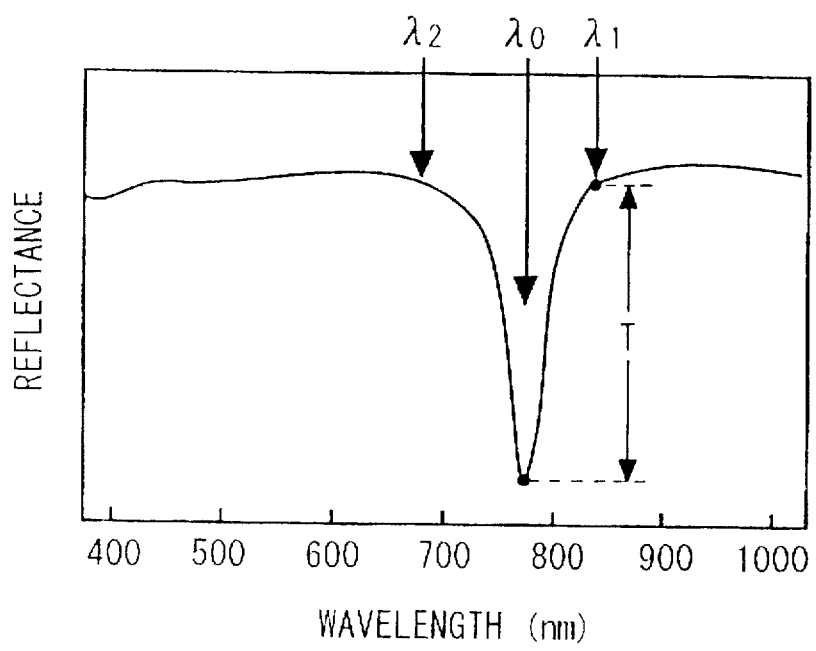
FIG. 2 is a graph showing an absorption spectrum of an infrared absorber which is ideal for the usage in the information storage medium in FIG. 1.

FIG. 2 shows an absorption spectrum of the infrared absorber which is ideal for the usage in the code storage portion 3 of the information storage medium 1 in FIG. 1. In FIG. 2 and so on, the absorption spectrum is represented by the reflectance of the absorber portion 3, and it is assumed that the base 2 reflects all the rays between 300 nm and 1100 mm.

As shown in FIG. 2, the reflectance of the infrared absorber is almost uniform when the wavelength of the rays emitted to the absorber is less than a value $\lambda_2$ (approximately 670 nm) and when the wavelength is greater than an upper value $\lambda_1$ (approximately 840 nm). More specifically, the absorption by the absorber material is little when the wavelength is less than a value $\lambda_2$ or when the wavelength is more than a value $\lambda_1$. On the other hand, the infrared absorber absorbs rays in a range from the wavelength $\lambda_2$ to the wavelength $\lambda_1$ very much.

Usually, rays having a wavelength between 700 nm and $10^6$ nm are called infrared, and rays having a wavelength between 400 nm and 700 nm are visible. Accordingly, the infrared absorber absorbs substantially only infrared within a narrow wavelength band, but absorbs visible rays little. The narrow wavelength band includes a peak value $\lambda_0$ (780 nm) at which the infrared absorber absorbs the most.

CONSTRUCTION OF JUDGING APPARATUS

Figure 3:
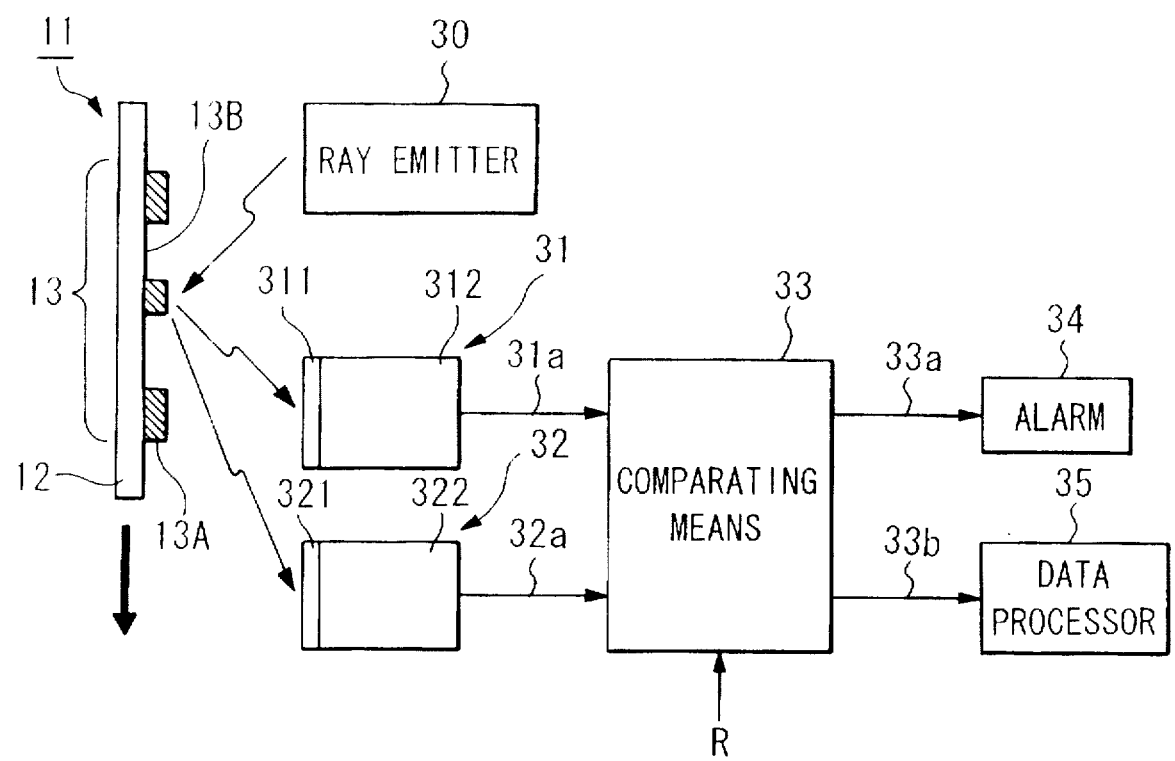
FIG. 3 is a schematic view showing a judging apparatus according to the present invention.

Next, referring to FIG. 3, an apparatus for reading subject information storage mediums, in case that the above described medium 1 is preferably the real information storage medium, will be described. In FIG. 3, a subject information storage medium 11 is shown, and reference signs 12 and 13 designate a card-like base and a code storage portion, respectively. The code storage portion 13 is constituted of absorber portions 13A and blank portions 13B arranged alternately. As represented in FIG. 3, the apparatus comprises a ray emitter 30, a first ray receiver 31, a second ray receiver 32 and a comparing means 33. The ray emitter 30 emits rays to the subject medium 11, the rays containing at least rays of the peak wavelength $\lambda_0$ and the rays of the wavelength $\lambda_1$.

The first receiver 31 includes a photoelectric conversion element 312 and an optical filter 311 mounted on the light receiving surface of the photoelectric conversion element 312. Through the optical filter 311, substantially only rays of the wavelength $\lambda_0$ (780 nm) pass, so that the photoelectric conversion element 312 receives substantially only those rays, and provides a first output signal 31a in accordance with the reflectance of the subject medium 11 at the peak wavelength $\lambda_0$.

The second receiver 32 also includes a photoelectric conversion element 322 and an optical filter 321 mounted on the light receiving surface of the photoelectric conversion element 322. Through the optical filter 321, substantially only rays of the wavelength $\lambda_1$ (840 nm) pass, so that the photoelectric conversion element 322 receives substantially only those rays, and provides a second output signal 32a in accordance with the reflectance of the subject medium 11 at the wavelength $\lambda_1$.

The comparing means 33 provides a judgment signal 33A on the basis of the first signal 31a and second signal 32a and a prescribed standard value R stored in a memory (not shown). The judgment signal 33a is transmitted to an alarm 34. Also, the comparing means 33 inspects the widths of the absorber portions 13A of the code storage portion 13 on the subject medium 11 and produces a readout code signal 33b based on the inspection of the widths. The readout code signal 33b is transmitted to a data processor 35.

OPERATION OF THE JUDGING APPARATUS

Next, the operation of the judging apparatus will be described with reference to FIGS. 3 and 4. The subject medium 11 is conveyed along the arrow in FIG. 3 by a conveyor (not shown). During the conveyance of the subject medium 11, the rays are emitted from the ray emitter 30 to the code storage portion 13, and are reflected from it. The reflected rays are received by the first and second receivers 31 and 32, and are converted to the first and second output signals 31a and 32a, respectively.

Figure 4:
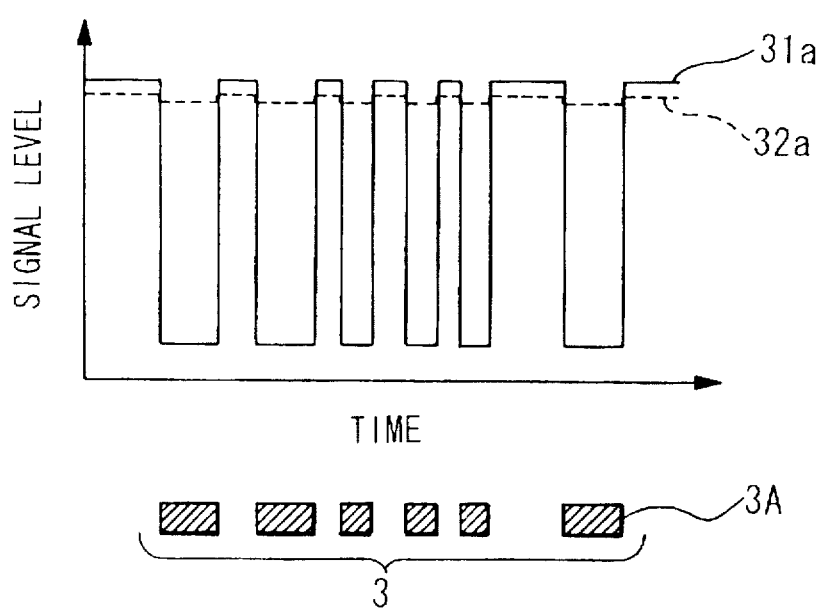
FIG. 4 is a graph showing the change of signals processed in the judging apparatus during the conveyance of the real information storage medium in FIG. 1.

Now, it is assumed that the subject medium 11 is the real medium 1 and that the medium 1 includes code storage portion 3 in which the absorber portions 3A are arranged as in the lower section of FIG. 4. Since the absorber portions 3A pass one by one during the conveyance of the information storage medium 1, the first signal 31a, representing the reflectance at the peak wavelength $\lambda_0$, changes as represented by the solid line in the upper section of FIG. 4. The second signal 32a, representing the reflectance at the wavelength $\lambda_1$, also changes as by the dotted line in FIG. 4.

If the subject medium 11 is real, the amplitude of the second signal 32a is much smaller than that of the first signal 31a since many of the rays at the wavelength $\lambda_1$ are not absorbed by the absorber portions 3A although many of the rays at the wavelength $\lambda_0$ are absorbed.

The comparing means 33 calculates a difference signal in accordance with the difference between the first signal 31a and second signal 32a, and compares the amplitude of the difference signal with the standard value R. In this case, if the amplitude is greater than the standard value R, the comparing means 33 provides the judgment signal 33a representing that the subject medium 11 is real. For example, the output judgment signal 33a is "one" when the alarm 34 is driven to sound by "zero" signal in the binary system.

The standard value R is determined in connection with the difference T (shown in FIG. 2) of the reflectance of the absorber portions 3A at the wavelength $\lambda_0$ and the reflectance at the wavelength $\lambda_1$. Thus, the comparing means 33 can recognize the subject medium 11 as a real one, and produces the judgment signal 33a representing that it is real.

Besides, the comparing means 33 compares the changing first signal 31a with the standard value R to compensate the pulse of the first signal 31a, and provides the readout code signal 33b which represents the codes or information stored in the code storage portion 3.

Figure 5:
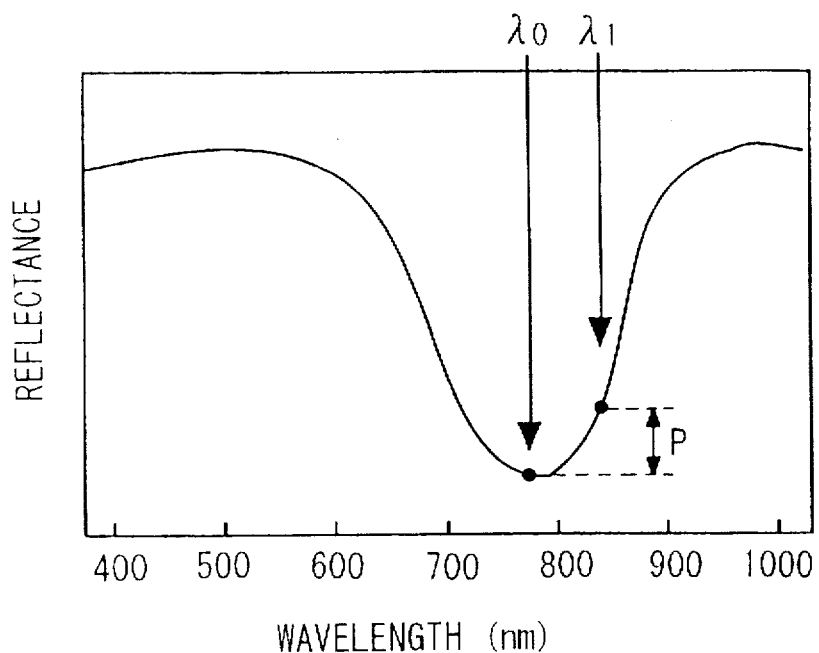
FIG. 5 is a graph showing an absorption spectrum of another light absorber which will be judged as a forgery by the apparatus shown in FIG. 3.

On the contrary, if the subject medium 11 includes the absorber portions 13A made of another light absorber of which the absorption characteristic is shown in FIG. 5, the reflectance at the wavelength $\lambda_0$ and the reflectance at the wavelength $\lambda_1$ are not very much different, so that not only many of the rays at the wavelength $\lambda_0$, but many rays at the wavelength $\lambda_1$ are absorbed by the light absorber.

Figure 6:
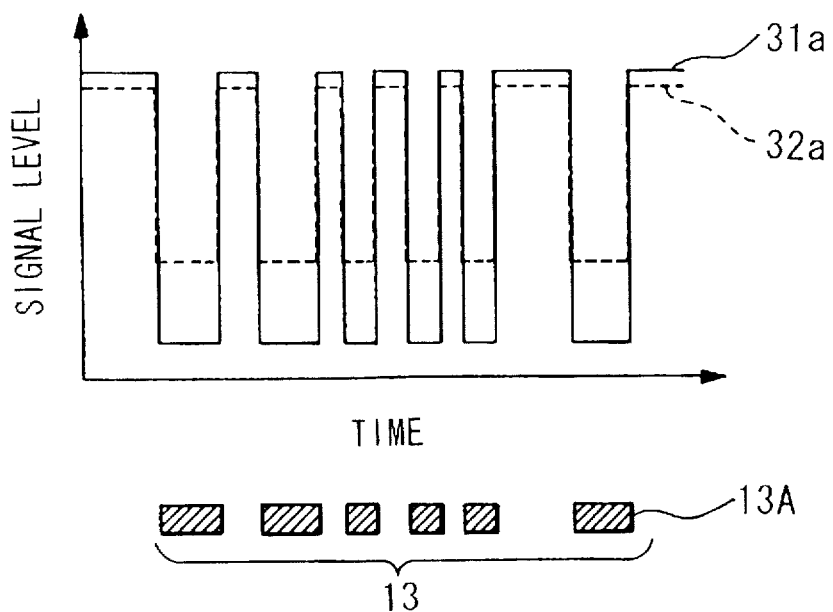
FIG. 6 is a graph showing the change of signals processed in the judging apparatus during the conveyance of an information storage medium using with the light absorber of which the absorption characteristic is shown in FIG. 5.

Now, it is assumed that the subject medium 11 is a forged one and that the light absorber thereof has the absorption characteristic in FIG. 5. The medium 11 includes absorber portions 13A arranged in the lower section of FIG. 6. Since the absorber portions 13A pass one by one, the first signal 31a, representing the reflectance at the peak wavelength $\lambda_0$, changes as represented by the solid line in the upper section of FIG. 6. The second signal 32a, representing the reflectance at the wavelength $\lambda_1$ also changes as by the dotted line in FIG. 6.

In this case, the amplitude of the second signal 32a is also smaller than that of the first signal 31a, however the difference therebetween is less than the standard value R. Therefore, the comparing means 33 provides the judgment signal 33a representing that the subject medium 11 is forged. For example, the judgment signal 33a is "zero", so that the alarm 34 sounds.

The reason why the judging apparatus utilizes the reflectance at the peak wavelength $\lambda_0$ and the reflectance at the wavelength $\lambda_1$ is that the reflectance-difference should be prescribed as great as possible since there is likelihood that some kinds of noises will be measured at the above-mentioned inspection of the reflectance-difference. As described above, the real absorbing material absorbs the rays at the peak wavelength $\lambda_0$ the most, and does not absorb many of the rays at the wavelength $\lambda_1$. Therefore, the reflectance-difference can be great, so that the signal-noise ratio can be excellent. Accordingly, an accurate judgement can be realized.

In addition, the wavelength $\lambda_1$ is near the peak wavelength $\lambda_0$ and at the critical point of the narrow wavelength band, so that the reflectance of the absorber differs remarkably between two wavelengths. Such an absorber, absorbing substantially only specific rays within the narrow wavelength band, is difficult extremely to be produced using with other components. In other words, it is prevented to forge or counterfeit the information storage medium 1 according to the present invention. Also, utilizing with the wavelength $\lambda_1$, which is near the peak wavelength $\lambda_0$ and is at the critical point of the narrow band, ensures an accurate detection of a forged medium.

In the practical use, the difference between the wavelength $\lambda_0$ and the wavelength $\lambda_1$ should be small, preferably, equal to or less than 100 nm in order to prevent the information storage medium from being forged. On the other hand, it is practically very difficult even for those skilled in the art to produce a light absorber if the difference between the wavelengths $\lambda_0$ and $\lambda_1$ is prescribed less than 10 nm. Therefore, if the difference between the wavelengths $\lambda_0$ and $\lambda_1$ is prescribed less than 10 nm, the signal-noise ratio will be bad. Accordingly, the difference between the wavelengths $\lambda_0$ and $\lambda_1$ is prescribed greater than 10 nm and equal to or less than 100 nm.

PREFERABLE EXAMPLE OF INFORMATION STORAGE MEDIUM

A specimen of the information storage medium which will be preferably used for the above-described apparatus was produced. In the specimen, a polyethylene terephlate sheet having a thickness of 188 μm was used for the base 2. The infrared absorber of the code storage portion 3 was a special ink for screen printing, constituted of a resin belonging to polyester at 50% by weight, infrared absorbing material belonging to phthalocyanine at 1% by weight, and cyclohexane at 49% by weight. The infrared absorber was formed on the base 2 by screen-printing, so that the information storage medium 1 having a bar-code-like code storage portion 3 was prepared.

Figure 7:
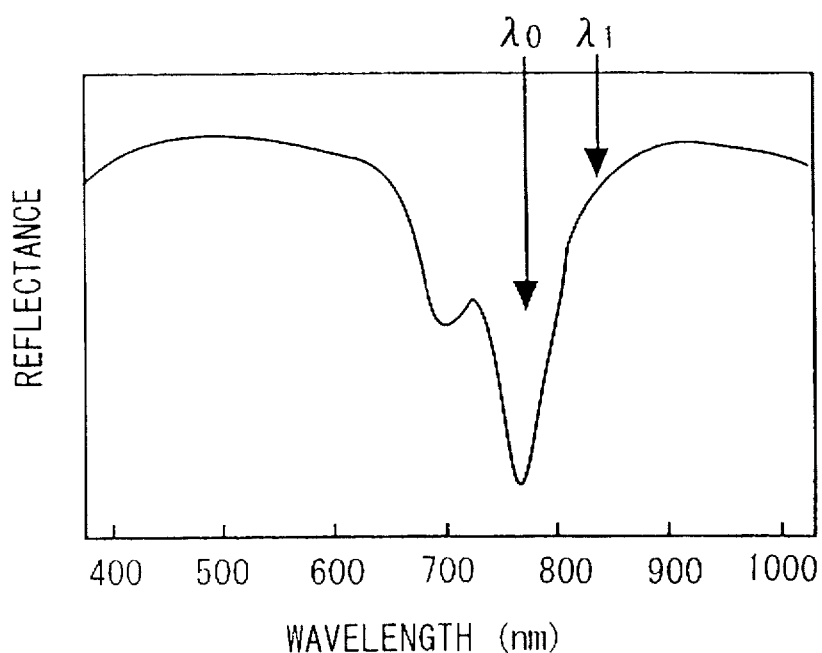
FIG. 7 is a graph showing an absorption spectrum of a light absorber in a specimen of an information storage medium which will be preferably used as a real medium for the apparatus in FIG. 3.

FIG. 7 shows the absorption spectrum of the absorber portions 3A of the specimen. As shown in FIG. 7, the absorber portions 3A of the specimen absorbed substantially only infrared rays within a narrow wavelength band and especially absorbed rays at the wavelength $\lambda_0$ (780 nm) most. The reflectance at the peak wavelength $\lambda_0$ and the reflectance at the wavelength $\lambda_1$ (840 nm) were very different and greater than the difference T (shown in FIG. 2). Accordingly, it will be appreciated that the amplitude of the difference between first signal 31a and the second signal 32a is greater than the standard value R, and this specimen can be judged real by the judging apparatus.

COMPARISON EXAMPLE OF INFORMATION STORAGE MEDIUM

On the other hand, a specimen, which will not be preferable for the medium by the invention, was produced. In this specimen, only the infrared absorbing material belonging to phthalocyanine was replaced by a pigment belonging to cianine, and other materials and components were the same as in the above-described specimen.

Figure 8:
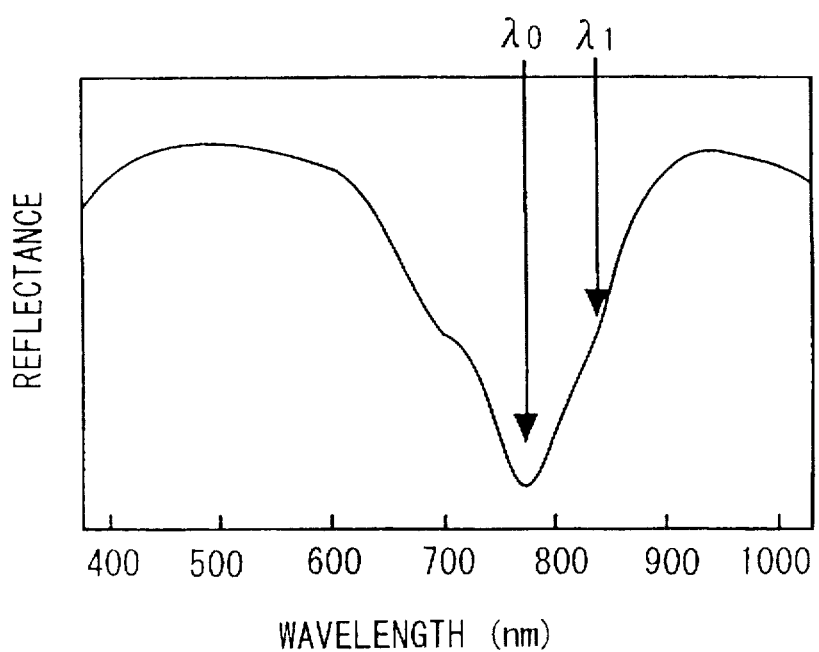
FIG. 8 is a graph showing an absorption spectrum of another light absorber in another specimen of an information storage medium which will be judged as a forgery by the apparatus shown in FIG. 3.

FIG. 8 shows the absorption spectrum of the absorber portions 3A of the specimen. As shown in FIG. 8, although the absorber portions 3A of the specimen absorbed rays at the wavelength $\lambda_0$ (780 nm) most, the reflectance at the wavelength $\lambda_1$ is much smaller than that shown in FIG. 7. Therefore, this specimen will be judged as a forgery by the judging apparatus since the difference between the reflectance at the peak wavelength $\lambda_0$ and the reflectance at the wavelength $\lambda_1$ (840 nm) were not very different.

SECOND EMBODIMENT

Figure 9:
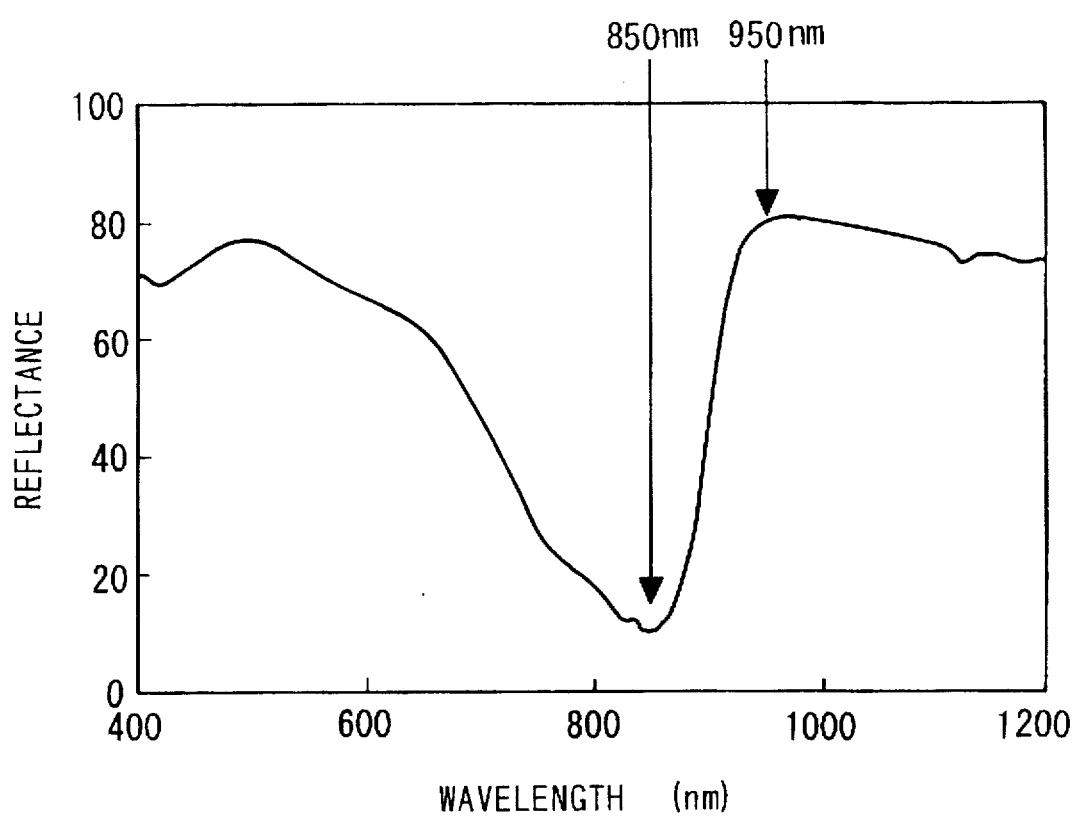
FIG. 9 is a graph showing an absorption spectrum of another light absorber in a second embodiment of an information storage medium according to the present invention.

FIG. 9 shows an absorption spectrum of another light absorber in a second embodiment of an information storage medium according to the present invention.

The light absorber was a special ink for screen printing, constituted of an ink medium, "SS8800-medium" manufactured by Toyo Ink Seizo Kabusiki Kaisha (Toyo Ink Manufacturing Co., Ltd.), at 99.5% by weight, and an infrared absorbing material, "NK-2911" manufactured by Kabushiki Kaisha Nihon Kanko Shikiso Kenkyusho (Japan Photosensitive Pigment Institute Co., Ltd), at 0.5% by weight. The infrared absorber was formed on the base 2 by screen-printing, so that the information storage medium 1 having a bar-code-like code storage portion 3 was prepared.

The screen-printing was conducted using with a tetron screen having 300 fibers per one inch. On the screen, the portions which did not correspond to the bar-code like absorber portions 3A were coated with a non-penetration emulsion of 7 μm thickness, so that the portions were prevented from being penetration of the special ink. The thickness of the completed absorber portions 3A was 2.5 μm.

As shown in FIG. 9, the reflectance of the light absorber was great when the wavelength of the rays emitted to the light absorber was less than approximately 600 nm and when the wavelength was greater than a value $\lambda_1$ (approximately 950 nm) More specifically, the absorption by the absorber material was little when the wavelength was less than 600 nm or when the wavelength was more than 950 nm. On the other hand, the light absorber absorbed rays in a range from 600 nm to 950 nm very much. Accordingly, the light absorber absorbed substantially only infrared within a narrow wavelength band, but absorbed visible rays little. The narrow wavelength band includes a peak value $\lambda_0$ (850 nm) at which the infrared absorber absorbed the most.

In this embodiment, the wavelength $\lambda_1$ (approximately 950 nm) is near the peak wavelength $\lambda_0$ (850 nm), i.e., the difference is approximately 100 nm. In addition, the wavelength $\lambda_1$ is at the critical point of the narrow wavelength band, so that the reflectance of the absorber differs remarkably between two wavelengths.

Therefore, the information storage medium in accordance with the second embodiment may be utilized for a real medium. In this case, the judging apparatus should be modified for detecting the peak wavelength $\lambda_0$ and the comparison wavelength $\lambda_1$ which are respectively 850 nm and about 950 nm.

ALTERATIONS AND MODIFICATIONS

Although the various features of the present invention have been described hereinbefore, it is to be understood that the invention is not limited to the foregoing description and the various modifications may be made in the invention without departing from the spirit and scope thereof as defined by the appended claims.

For example, it is not limited to use the infrared absorber for the absorber portions 3A. Instead, another light absorber may be used for the absorber portions 3A as long as it absorbs substantially only specific rays within a narrow wavelength band. In this case, the codes or information stored in the code storage portion 3 may be read, but it is assured that the information storage medium is extremely difficult to be forged.

It is possible to provide the information storage medium 1 with a surface layer for concealing the code storage portion 3 and/or a protection layer for improving the durability of the code storage portion 3 if necessary. For the purpose of the protection layer, a resin, which is transparent for both visible rays and infrared rays, may be used.

The base 2 may be manufactured of any kind of materials as long as the materials reflect the rays of at least the wavelength $\lambda_1$. For instance, it is possible to use vinylchloride, polyethylene terephlate, paper, metals and the like. In addition, many kinds of merchandise may be used for base 2. That is, the code storage portion 3 can be formed on the merchandise directly.

The absorber portions 3A may be formed on the base 2 by means of various methods, for example, the offset printing, gravure, letterpress printing, intaglio printing, thermal transferring and pressure transferring. The components of the absorber portions 3A may include various annexes although the absorber portions 3A can be produced of at least a light absorber and resin for fixing the light absorber on the base 2. The resin, which should be decided in relation to the base 2 and to the light absorber, may be selected from natural or artificial resin.

As described above, the ay emitter 30 should emit rays containing at least rays of the peak wavelength $\lambda_0$ and the rays of the wavelength $\lambda_1$. In regard to this, it is possible that the ray emitter 30 emits rays of which the intensity is uniform in a wide range of wavelength including the wavelengths $\lambda_0$ and $\lambda_1$. Alternatively, it is possible that the intensity of the rays is not uniform, i.e., the intensity may have peaks at the wavelengths $\lambda_0$ and $\lambda_1$.

Besides, it is possible that the ray emitter emits the rays of the wavelength $\lambda_0$ and the rays of the wavelength $\lambda_1$ at different instances. In this case, a single ray receiver, which can detects the rays at both wavelengths $\lambda_0$ and $\lambda_1$, may be used, and a memory should be used for storing at least the primarily detected reflectance at the wavelength $\lambda_0$ or $\lambda_1$, so that the comparing means 33 can evaluate reflectance at both wavelength.

Although it is described above that the comparing means 33 emits the code signal 33b after the compensation of the pulse of the first signal 31a, the comparing means 33 may be manufactured or adjusted to output the received first signal 31a as it is.

In addition, in the above description, the reflectance at the peak absorption wavelength $\lambda_0$ and the reflectance at the wavelength $\lambda_1$ are detected to prescribe the reflectance-difference T (FIG. 2) great value and obtain the difference signal having an excellent signal-noise ratio. However, it is possible that the detected wavelength is not the peak absorption wavelength if the reflectance-difference T can be great so that the comparing means 33 can obtain the difference signal having an excellent signal noise ratio.

In the judging apparatus, it is possible that the standard value R is variable. In this case, the standard value R will be determined high for expensive goods which need high reliability. On the other hand, the standard value R will be determined low for inexpensive goods which do not need high reliability.

What is claimed is:

1. An information storage medium comprising:
  a base portion; and
  a code storage portion disposed on said base portion, said code storage portion containing an infrared absorber, said infrared absorber being capable of absorbing substantially only infrared rays within a narrow wavelength band, wherein said infrared absorber has a first reflectance at said narrow wavelength band and a second reflectance at a second wavelength at a critical point of said narrow band, the difference between the first reflectance and the second reflectance being equal to or less than 100 nm.

2. A method for judging if a subject information storage medium is real or a forgery wherein a real information storage medium includes a base portion and a code storage portion disposed on said base portion, said code storage portion containing a light absorber, said light absorber being capable of absorbing substantially only specific rays within a narrow wavelength band, the narrow wavelength band including a peak wavelength at which the light absorber absorbs the most, the method comprising the steps of:
  emitting rays onto said subject information storage medium;
  receiving rays reflected from said subject medium;
  detecting a first reflectance at said peak wavelength and a second reflectance at a comparison wavelength near said peak wavelength, rays at the comparison wavelength not being significantly absorbed by said light absorber; and
  judging if said subject medium is real or not on the basis of said first reflectance and said second reflectance.

3. A method according to claim 2, wherein said judging step comprising obtaining a difference between said first reflectance and said second reflectance, and judging said subject medium to be real if said difference between said first reflectance and said second reflectance is greater than a certain value, and judging said subject medium to be a forgery if said difference is equal to or less than said certain value.

4. A method according to claim 3, wherein said light absorber is capable of absorbing substantially only infrared rays within a narrow wavelength band, said rays used at said emitting step containing at least infrared rays which are absorbed by said light absorber.

5. A method according to claim 4, wherein a difference between said peak wavelength and said comparison wavelength is greater than 10 nm and equal to or less than 100 nm.

6. A method according to claim 2, wherein said light absorber is capable of absorbing substantially only infrared rays within a narrow wavelength band, said rays used at said emitting step containing at least infrared rays which are absorbed by said light absorber.

7. A method according to claim 6, wherein a difference between said peak wavelength and said comparison wavelength is greater than 10 nm and equal to or less than 100 nm.

8. An apparatus for judging if a subject information storage medium is real or a forgery wherein a real information storage medium includes a base portion and a code storage portion disposed on said base portion, said code storage portion containing a light absorber, said light absorber being capable of absorbing substantially only specific rays within a narrow wavelength band, the narrow wavelength band including a peak wavelength at which the light absorber absorbs the most, the apparatus comprising:
  an emitting means for emitting rays onto said subject information storage medium, said rays containing at least rays of said peak wavelength and rays of a comparison wavelength near said peak wavelength, rays at the comparison wavelength not being significantly absorbed by said light absorber;
  receiving means for receiving rays reflected from said subject medium, and providing a first output signal in accordance with a first reflectance at said peak wavelength and a second output signal in accordance with a second reflectance at said comparison wavelength; and
  a judging means for obtaining a difference between said first signal and said second signal, and judging if said subject medium is real or not on the basis of said difference between said first signal and said second signal.

9. An apparatus according to claim 8, wherein said judging means judges said subject medium to be real if said difference between said first signal and said second signal is greater than a certain value and judges said subject medium to be a forgery if said difference is equal to or less than said certain value.

10. An apparatus according to claim 9, wherein said emitting means emits at least infrared rays for inspecting said subject medium when said light absorber of said real information storage medium is an infrared absorber, said infrared absorber being capable of absorbing substantially only infrared within a narrow wavelength band.

11. An apparatus according to claim 10, wherein a difference between said peak wavelength and said comparison wavelength, by which said receiving means provides said first and second output signals, is greater than 10 nm and equal to or less than 100 nm.

12. An apparatus according to claim 8, wherein said emitting means emits at least infrared rays for inspecting said subject medium when said light absorber of said real information storage medium is an infrared absorber, said infrared absorber being capable of absorbing substantially only infrared within a narrow wavelength band.

13. An apparatus according to claim 12, wherein a difference between said peak wavelength and said comparison wavelength, by which said receiving means provides said first and second output signals, is greater than 10 nm and equal to or less than 100 nm.

* * * * *